United States Patent
Li et al.

(10) Patent No.: US 11,227,190 B1
(45) Date of Patent: Jan. 18, 2022

(54) GRAPH NEURAL NETWORK TRAINING METHODS AND SYSTEMS

(71) Applicant: ALIPAY (HANGZHOU) INFORMATION TECHNOLOGY CO., LTD., Zhejiang (CN)

(72) Inventors: Houyi Li, Hangzhou (CN); Changhua He, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,963

(22) Filed: Jun. 29, 2021

(51) Int. Cl.
| G06K 9/00 | (2006.01) |
| G06K 9/62 | (2006.01) |
| G06F 9/50 | (2006.01) |
| G06N 3/04 | (2006.01) |

(52) U.S. Cl.
CPC .......... *G06K 9/6257* (2013.01); *G06F 9/5094* (2013.01); *G06N 3/04* (2013.01)

(58) Field of Classification Search
CPC ....... G06K 9/6257; G06N 3/04; G06F 9/5094
See application file for complete search history.

(56) References Cited

U.S. PATENT DOCUMENTS

| 2019/0378049 | A1* | 12/2019 | Widmann | ............ G06N 3/0472 |
| 2021/0019630 | A1* | 1/2021 | Yao | ........................ G06K 9/6257 |
| 2021/0034737 | A1* | 2/2021 | Khan | ........................ G06N 3/04 |
| 2021/0049458 | A1* | 2/2021 | Chang | ........................ G06N 3/04 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

*Primary Examiner* — Ping Y Hsieh
(74) *Attorney, Agent, or Firm* — Fish & Richardson P.C.

(57) ABSTRACT

Methods, systems, and apparatus for training a graph neural network. An example method includes obtaining a complete graph; dividing the complete graph into a plurality of subgraphs; obtaining a training graph to participate in graph neural network training based on selecting at least one subgraph from the plurality of subgraphs; obtaining, based on the training graph, a node feature vector of each node in the training graph; obtaining a node fusion vector of each current node in the training graph; determining a loss function based on node labels and the node fusion vectors in the training graph; and iteratively training the graph neural network to update parameter values of the graph neural network based on optimizing the loss function.

20 Claims, 4 Drawing Sheets

GRAPH NEURAL NETWORK TRAINING METHODS AND SYSTEMS

CROSS-REFERENCE TO RELATED APPLICATIONS

This application claims priority to Chinese Patent Application No. 202010864281.0, filed on Aug. 25, 2020, which is hereby incorporated by reference in its entirety.

TECHNICAL FIELD

The present specification relates to the field of machine learning, and in particular, to graph neural network training methods and systems.

BACKGROUND

With the rise of graph neural network application in industry, a scale of a graph becomes larger with the increase of processed data. For example, social networks may involve more than 1 billion users and more than 100 billion relationships. If the users and the relationships are abstracted as a graph, a scale of the graph is more than 1 billion nodes. The increase of the graph scale causes difficulties in graph neural network training.

Therefore, graph neural network training methods are desired.

SUMMARY

One aspect of the present specification provides graph neural network training methods. The methods include the following: A complete graph is obtained, and the complete graph is divided into a plurality of subgraphs according to a predetermined condition. At least one subgraph that is to participate in graph neural network training is selected from the plurality of subgraphs, a training graph is obtained based on the at least one subgraph that is to participate in graph neural network training, and a node feature vector of each node in the training graph is obtained based on the training graph. Propagation and aggregation are performed based on the node feature vector of each node in the training graph and edges between nodes, to obtain a node fusion vector that is of each current node in the training graph and that includes neighboring node features and edge features. A loss function is obtained based on a node label and the node fusion vector in the training graph, and an initial graph neural network is iteratively trained based on the loss function to obtain the graph neural network.

In some embodiments, that the complete graph is divided into a plurality of subgraphs according to a predetermined condition includes the following: The complete graph is divided into the plurality of subgraphs according to the predetermined condition by using a community discovery algorithm.

In some embodiments, the predetermined condition includes the following: A quantity of neighboring nodes of a subgraph and a quantity of edges included in the subgraph satisfy a first condition, and a quantity of nodes included in the subgraph is less than or equal to a predetermined threshold quantity.

In some embodiments, that at least one subgraph that is to participate in graph neural network training is selected from the plurality of subgraphs includes the following: An updated subgraph for each of the plurality of subgraphs is obtained based on the subgraph and T-th-degree neighbors of the subgraph, and at least one subgraph that is to participate in graph neural network training is selected from a plurality of updated subgraphs.

In some embodiments, that a training graph is obtained based on the at least one subgraph that is to participate in graph neural network training includes the following: The training graph is generated based on a union set of the at least one subgraph that is to participate in graph neural network training.

Another aspect of the present specification provides graph neural network training systems. The systems include the following: a first determining module, configured to obtain a complete graph, and divide the complete graph into a plurality of subgraphs according to a predetermined condition; a second determining module, configured to select at least one subgraph that is to participate in graph neural network training from the plurality of subgraphs, obtain a training graph based on the at least one subgraph that is to participate in graph neural network training, and obtain, based on the training graph, a node feature vector of each node in the training graph; a fusion module, configured to perform propagation and aggregation based on the node feature vector of each node in the training graph and edges between nodes, to obtain a node fusion vector that is of each current node in the training graph and that includes neighboring node features and edge features; and a training module, configured to obtain a loss function based on a node label and the node fusion vector in the training graph, and iteratively train an initial graph neural network based on the loss function to obtain the graph neural network.

Another aspect of the present specification provides graph neural network training apparatuses, including a processor. The processor is configured to perform the graph neural network training methods described above.

Another aspect of the present specification provides computer readable storage media. The storage media store computer instructions. After a computer reads the computer instructions in the storage media, the computer performs the graph neural network training methods described above.

BRIEF DESCRIPTION OF DRAWINGS

The present specification is further described by using example embodiments, and these example embodiments are described in detail with reference to the accompanying drawings. These embodiments are not restrictive. In these embodiments, the same serial number indicates the same structure.

DETAILED DESCRIPTION OF EMBODIMENTS

Figure 1:
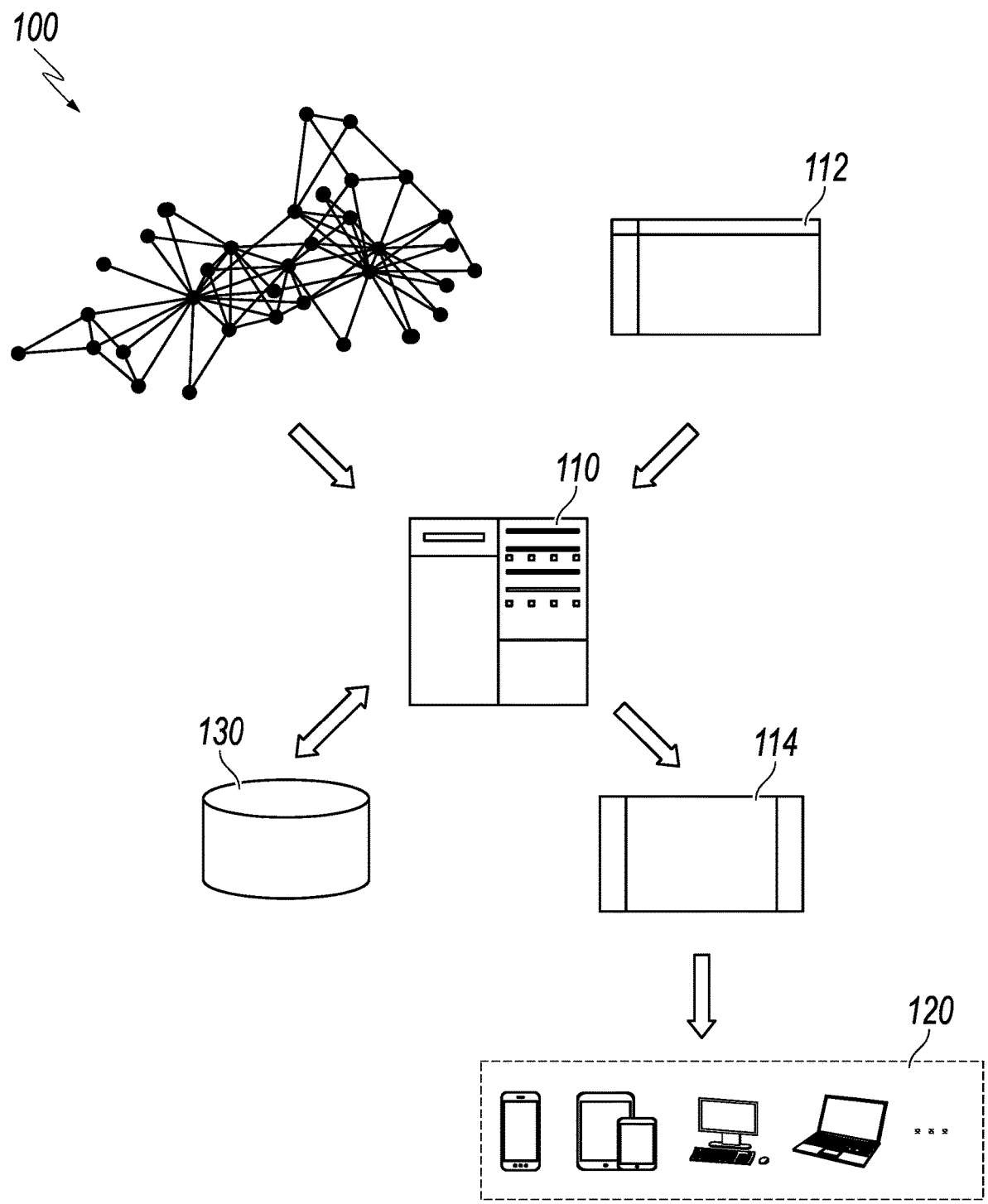
FIG. 1 is a schematic diagram illustrating an application scenario of a graph neural network training method, according to some embodiments of the present specification.

To describe the technical solutions in the embodiments of the present specification more clearly, the following briefly describes the accompanying drawings needed for describing the embodiments. Clearly, the accompanying drawings in the following description show merely some examples or embodiments of the present specification, and a person of ordinary skill in the art can apply the present specification to other similar scenarios based on these accompanying drawings without creative efforts. Unless it is obvious from the language context or otherwise stated, the same numeral in the drawings represents the same structure or operation.

It should be understood that the "systems", "apparatuses", "units", and/or "modules" used in the present specification are a way for distinguishing between different components, elements, parts, portions, or assemblies of different levels. However, the words can be replaced by other expressions that can achieve the same purpose.

In the present specification and the claims, the words "a", "an", and/or "the" do not specifically refer to the singular and can also include the plural, unless otherwise specified in the context clearly. Generally, the terms "include" and "comprise" merely indicate that the clearly identified steps and elements are included, and these steps and elements do not constitute an exclusive listing. The methods or devices may further include other steps or elements.

In the present specification, although various references are made to certain modules or units in the systems according to the embodiments of the present specification, any quantity of different modules or units can be used and run on a client device and/or server. The modules are merely illustrative, and different modules can be used in different aspects of the systems and methods.

Flowcharts are used in the present specification to illustrate the operations performed by the systems according to the embodiments of the present specification. It should be understood that the preceding or following operations are not necessarily performed precisely in order. Instead, the steps can be processed in reverse order or at the same time. In addition, other operations can be added to these procedures, or one or more operations can be removed from these procedures.

Embodiments of the present specification provide graph neural network training methods. In some embodiments, samples can be taken as nodes, and relationships between the samples can be represented by edges between the nodes, so as to form a complete graph reflecting attribute features of sample data. When there is a large amount of sample data or there are many relationships between samples, a scale of a corresponding graph is large. When a complete graph formed by the samples is used for graph neural network training, the amount of data is large, which may cause problems that an initial graph neural network system is difficult to accommodate and calculate the data, training costs are high, etc. In some embodiments, the complete graph formed by the sample data can be divided into a plurality of subgraphs, at least one subgraph is selected from the plurality of subgraphs, and a graph neural network is obtained through training based on the selected at least one subgraph. In some embodiments, the subgraph can be updated based on a neighboring node of the subgraph, and the graph neural network can be trained based on an updated subgraph.

FIG. 1 is a schematic diagram illustrating an application scenario of a graph neural network training method, according to some embodiments of the present specification.

As shown in FIG. 1, a scenario 100 can include a server 110, a terminal device 120, and a storage device 130.

The scenario 100 can be applied to a plurality of scenarios of graph neural network training. For example, the server 110 can obtain record data such as personal consumption, repayment, loans, and transfer in of a user, and relationship data such as transfer and entrusted payment between the user and other users from the storage device 130 and/or the terminal device 120 as sample data, and train, based on a complete graph formed by the sample data, a graph neural network for financial recommendation. For another example, the server 110 can obtain data such as purchase, browse, returned purchase, refunds, and goods replacement of a user from the storage device 130 and/or the terminal device 120 as sample data, and train, based on a complete graph formed by the sample data, a graph neural network for recommending goods to the user. For still another example, the server 110 can obtain social relationship data between a user and other users from the storage device 130 and/or the terminal device 120 as sample data, and train, based on the sample data, a graph neural network for recommending to the user social groups/organizations/people who may be known to the user.

In some embodiments, the server 110 can divide a complete graph 140 formed by samples as nodes into a plurality of subgraphs including nodes that are more relevant to each other, and select at least one subgraph that is to participate in graph neural network training from the plurality of subgraphs obtained through division, to obtain a training graph; perform propagation and aggregation based on a node feature vector of each node in the training graph and edges between nodes, to obtain a node fusion vector that is of each current node and that includes neighboring node features and edge features; and obtain a loss function based on a node label and the node fusion vector, and iteratively train an initial graph neural network model 112 based on the loss function to obtain a trained graph neural network model 114.

In some embodiments, the complete graph 140 can be formed by sample data obtained from the terminal device 120. In some embodiments, the server 110 can obtain the complete graph 140 from the storage device 130. In some embodiments, the server 110 can store the plurality of subgraphs obtained through division in the storage device 130. In some embodiments, the server 110 can obtain sample data from the terminal device, form the complete graph 140 based on the sample data, and store the complete graph 140 in the storage device 130. In some embodiments, the trained graph neural network model 114 can be sent to the terminal device 120, and the terminal device 120 can use the graph neural network model 114 to perform relevant prediction.

The server 110 can include various devices with a computing capability, such as a computer. In some embodiments, the server can be an independent server or a server group, and the server group can be centralized or distributed. In some embodiments, the server can be local or remote. In some embodiments, the server can run on a cloud platform. For example, the cloud platform can include one or any combination of a private cloud, a public cloud, a hybrid cloud, a community cloud, a distributed cloud, an internal cloud, etc. In some embodiments, the server 110 can access, by using a network, information and/or data stored in the terminal device 120 and the storage device 130. In some embodiments, the server 110 can be directly connected to the terminal device 120 and the storage device 130, so as to access the information and/or the data stored in the terminal device 120 and the storage device 130. In some embodiments, the server 110 can include a processor. The processor can process data and/or information related to graph neural network training to implement one or more functions described in the present specification.

The terminal device 120 can be various devices with information receiving and/or sending functions, such as a computer, a mobile phone, a text scanning device, a display device, and a printer. The terminal device 120 can be an electronic device used by the user, and can include various mobile devices, smart devices, wearable devices, etc., such as mobile phones, smart bracelets, and on-board computers. In some embodiments, the user can use the terminal device 120 to obtain recommendation information predicted by the graph neural network model 114.

The storage device 130 can be configured to store data and/or instructions. The storage device 130 can include one or more storage components, and each storage component can be an independent device or a part of another device. In some embodiments, the storage device 130 can include a random access memory (RAM), a read-only memory (ROM), a mass memory, a removable memory, a volatile read-write memory, etc., or any combination thereof. For example, the mass memory can include a magnetic disk, a compact disc, a solid state disk, etc. In some embodiments, the storage device 130 can be implemented on a cloud platform. Merely as an example, the cloud platform can include a private cloud, a public cloud, a hybrid cloud, a community cloud, a distributed cloud, an internal cloud, a multilayer cloud, etc., or any combination thereof. Data refers to a digital representation of information, and can include various types, such as binary data, text data, image data, and video data. An instruction refers to a program that can control a device or a component to perform a specific function.

The complete graph 140 is a graph that is formed by all sample data and that is used to reflect sample attributes and relationships between samples. The complete graph 140 can include a node set including samples as nodes, and an edge set that is formed by edges connecting two nodes and that is used to represent relevance measure between samples. In some embodiments, different types of complete graphs can be built based on different types of sample data. For example, a complete social relationship graph can be built by using social relationships between users as edges, and a complete funds graph can be built by using relationships such as transfer and entrusted payment between users as edges. For another example, a complete shopping graph can be built based on users, goods, and browse and purchase relationships between users and goods; a complete supply chain graph can be built based on goods, stores, suppliers, and relationships among them; and a complete logistics graph can be built based on packages, stations, delivery men, and relationships among them. For still another example, a complete medium graph can be built based on users, user devices, and login and registration relationships; and a complete web page graph can be built based on web pages, authors, and creation and reference relationships among them. In some embodiments, a natural complete geographic graph can be built based on various buildings on a map and relationships among geographic locations of the buildings; and a complete knowledge graph can be built based on knowledge and relationship among different knowledge. A graph neural network is trained based on a complete graph reflecting associations between samples, so that more accurate prediction results can be obtained when the graph neural network is used for prediction.

In some embodiments, the storage device 130 can be a part of the server 110 and/or the terminal device 120. In some embodiments, the initial graph neural network model 112 and/or the trained graph neural network model 114 can be stored in the terminal device 120 and/or the storage device 130.

Figure 2:
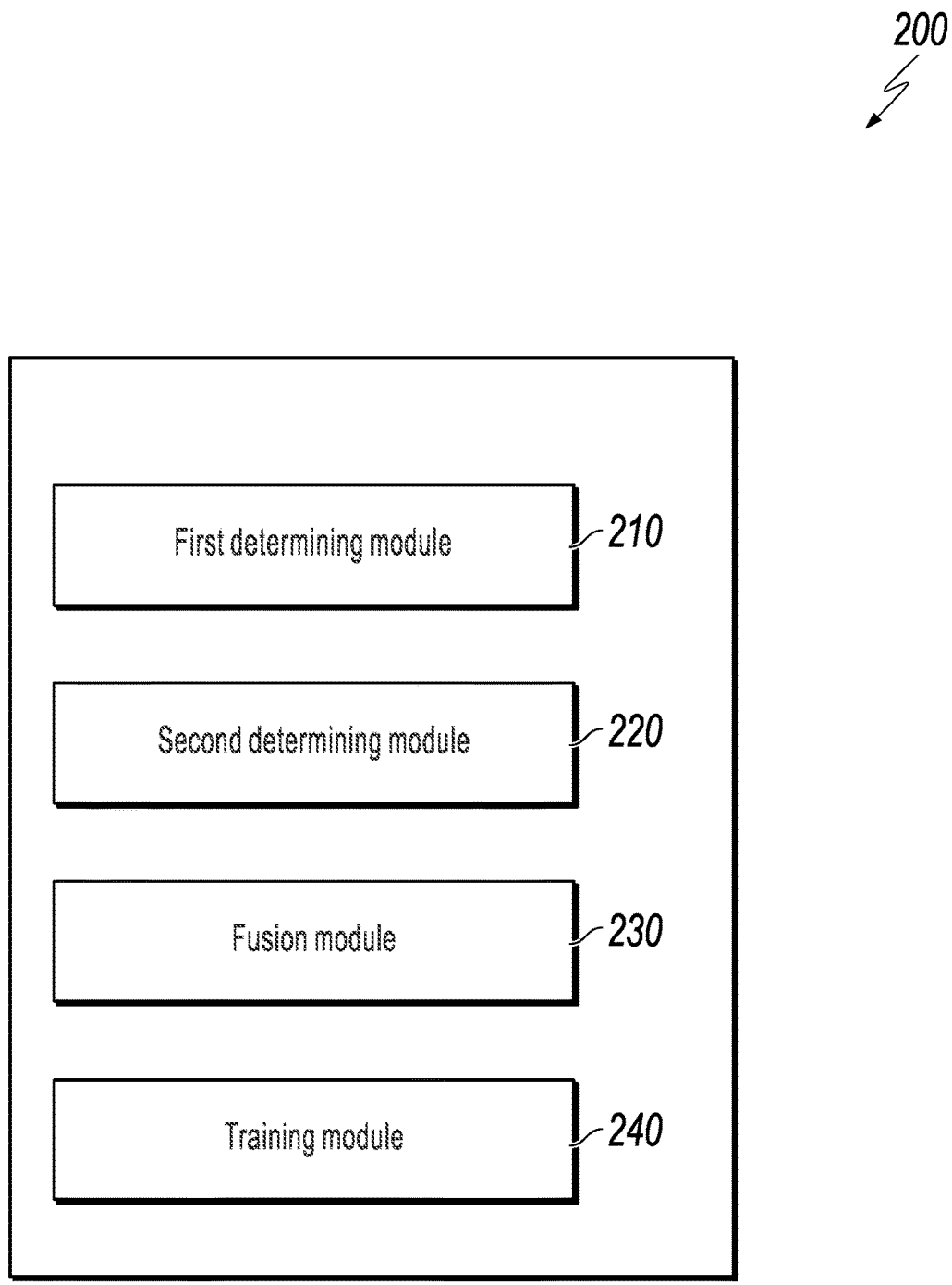
FIG. 2 is an example module diagram illustrating a graph neural network training system, according to some embodiments of the present specification.

FIG. 2 is an example module diagram illustrating a graph neural network training system, according to some embodiments of the present specification.

As shown in FIG. 2, in some embodiments, a graph neural network training system 200 can include a first determining module 210, a second determining module 220, a fusion module 230, and a training module 240. These modules can alternatively be implemented as applications or as a set of instructions read and executed by a processing engine. In addition, the modules can be any combinations of hardware circuits and applications/instructions. For example, when the processing engine or a processor executes an application/a set of instructions, a module can be a part of the processor.

The first determining module 210 can be configured to determine a subgraph. In some embodiments, the first determining module 210 can obtain a complete graph, and divide the complete graph into a plurality of subgraphs according to a predetermined condition. In some embodiments, the first determining module 210 can divide the complete graph into the plurality of subgraphs according to the predetermined condition by using a community discovery algorithm. In some embodiments, the predetermined condition can include the following: A quantity of neighboring nodes of a subgraph and a quantity of edges included in the subgraph satisfy a first condition, and a quantity of nodes included in the subgraph is less than or equal to a predetermined threshold quantity. In some embodiments, the first determining module 210 can obtain an updated subgraph for each of the plurality of subgraphs based on the subgraph and T-th-degree neighbors of the subgraph.

The second determining module 220 can be configured to determine a training graph. In some embodiments, the second determining module 220 can select at least one subgraph that is to participate in graph neural network training from the plurality of subgraphs, and obtain a training graph based on the at least one subgraph that is to participate in graph neural network training. In some embodiments, the second determining module 220 can select at least one subgraph that is to participate in graph neural network training from a plurality of updated subgraphs. In some embodiments, the second determining module 220 can generate the training graph based on a union set of the at least one subgraph that is to participate in graph neural network training. In some embodiments, the second determining module 220 can obtain, based on the training graph, a node feature vector of each node in the training graph.

The fusion module 230 can be configured to determine a node fusion vector. In some embodiments, the fusion module 230 can perform propagation and aggregation based on the node feature vector of each node in the training graph and edges between nodes, to obtain a node fusion vector that is of each current node in the training graph and that includes neighboring node features and edge features.

The training module 240 can be configured to train a graph neural network. In some embodiments, the training module 240 can obtain a loss function based on a node label and the node fusion vector in the training graph, and iteratively train an initial graph neural network based on the loss function to obtain the graph neural network.

It should be understood that the system and the modules of the system can be implemented in various ways. For example, in some embodiments, the system 200 and the modules of the system 200 can be implemented by hardware, software, or a combination of software and hardware. A hardware part can be implemented by dedicated logic. A software part can be stored in a memory and executed by an appropriate instruction execution system, such as a microprocessor or specially designed hardware. A person skilled in the art can understand that the previously described methods and systems can be implemented by using computer executable instructions and/or being included in processor control code. For example, such code is provided on a carrier medium such as a magnetic disk, a compact disc (CD), or a digital versatile disc-read only memory (DVD-ROM), a programmable memory such as a read only memory (firmware), or a data carrier such as an optical or electronic signal carrier. The systems and the modules of the systems in the present specification can be implemented by hardware circuits of very large scale integrated circuits or gate arrays, semiconductors such as logic chips and transistors, or programmable hardware devices such as field programmable gate arrays and programmable logic devices, or implemented by software executed by, for example, various types of processors, or implemented by a combination (for example, firmware) of the previous hardware circuits and software.

It is worthwhile to note that the previous system 200 and the modules of the system 200 are described only for convenience of description, and the present specification cannot be limited to the scope of the described embodiments. It can be understood that after understanding the principle of the system, a person skilled in the art may arbitrarily combine the modules or build a subsystem to connect to other modules without departing from the principle. In some embodiments, the first determining module 210, the second determining module 220, the fusion module 230, and the training module 240 can be different modules in a system, or functions of the previous two or more modules can be implemented by one module. In some embodiments, the first determining module 210, the second determining module 220, the fusion module 230, and the training module 240 can share one storage module, or the modules can have their respective storage modules. All such variants fall within the protection scope of the present specification.

Figure 3:
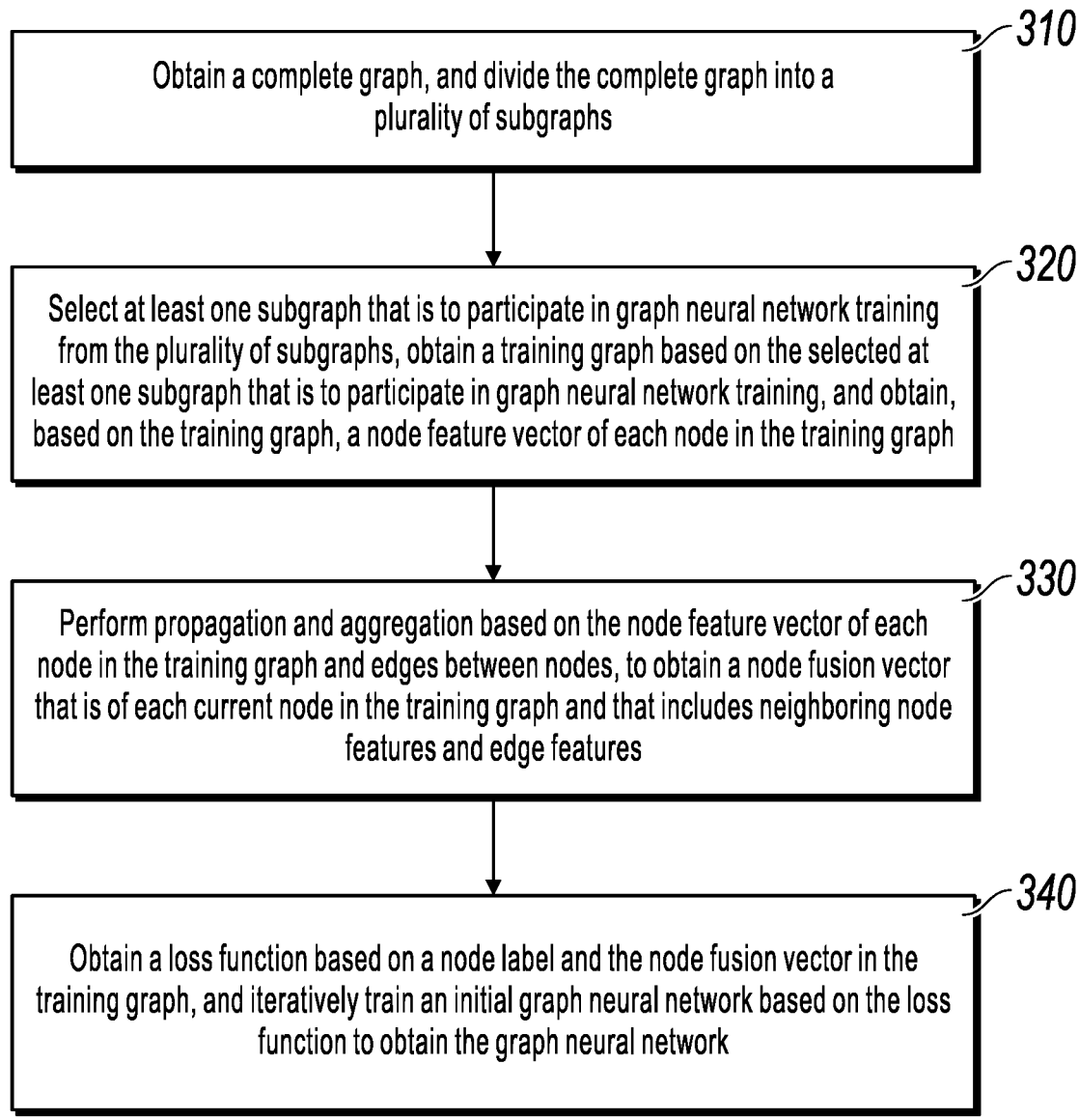
FIG. 3 is an example flowchart illustrating a graph neural network training method, according to some embodiments of the present specification.

FIG. 3 is an example flowchart illustrating a graph neural network training method, according to some embodiments of the present specification.

In the embodiments of the present specification, a graph is a data structure, which is modeling of a group of objects (nodes) and relationships (edges) between the objects. All nodes of the graph form a node set, and all edges of the graph form an edge set. Each edge in the edge set has a unique starting point and arrival point, and the starting point and the arrival point of each edge are members of the node set of the graph. For example, a graph of web pages can be obtained through modeling of web pages as nodes and reference relationships between the web pages as edges, and a graph of funds can be obtained by using users as nodes and relationships such as transfer and entrusted payment between the users as edges.

A graph neural network (GNN) is an artificial neural network, which can implement classification or prediction of data/information by learning topological information and attribute information on a graph. For example, when an initial graph neural network is trained based on a graph built by using users as nodes and relationships such as transfer and entrusted payment between the users as edges, the initial graph neural network can learn attribute information and relationship information of the users in the graph to obtain a trained graph neural network, and the trained graph neural network can be used to predict shopping preference, credit risk, etc. of the users.

The graph neural network training methods provided in the embodiments of the present specification can be used to train any one or more types of graph neural networks, such as graph convolution networks (GCN), graph attention networks, graph autoencoders, graph generative networks, and graph spatial-temporal networks.

As shown in FIG. 3, a procedure 300 can be performed by a processor (such as the server 110) or the graph neural network training system 200. The procedure 300 includes the following:

Step 310: Obtain a complete graph, and divide the complete graph into a plurality of subgraphs. In some embodiments, step 310 can be performed by the first determining module 210.

In the embodiments of the present specification, a complete graph can be a graph including all nodes (that is, all sample data), edges (relationships between samples), and attributes of all nodes and/or edges. The attributes of nodes refer to features of the sample data, and the attributes of edges refer to features of associations between the samples. For example, the complete graph can be a graph including all users of ALIPAY. In this case, the attributes of nodes can be features such as ALIPAY assets, account age, and monthly consumption of the users. The features of edges can be features such as quantities of transfer times, amounts of transfer, and dates of transfer between the users.

In some embodiments, the processor can obtain a complete graph from a database, for example, the storage device 130. In some embodiments, the processor can obtain a complete graph from a terminal device (such as the terminal device 120). In some embodiments, the processor can obtain a complete graph from a data source (such as an open source database). In some embodiments, the processor can obtain sample data and generate a complete graph based on the sample data.

A subgraph is a part of a complete graph, that is, a node set of the subgraph is any subset of a node set of the complete graph. In some embodiments, a predetermined condition can include the following: a quantity of nodes included in a subgraph is less than or equal to a predetermined threshold quantity, and/or a quantity of neighboring nodes of the subgraph and a quantity of edges included in the subgraph satisfy a first condition. Merely as an example, the predetermined threshold quantity can be a numerical value such as 50000, 100000, 300000, 1 million, or 3 million. The predetermined threshold quantity can be determined based on actual situations, for example, based on performance of an initial graph neural network system. When data processing performance of the system is good, the predetermined threshold quantity can be set to 2 million; and when the performance is poor, the predetermined threshold quantity can be set to 50000. This is not limited in the present specification. The first condition can be used to limit a quantity of edges between subgraphs. In some embodiments, the first condition can be set to achieve a target that a quantity of edges between subgraphs is far less than a quantity of edges included in the subgraphs. For example, the first condition can be that a ratio of a quantity of neighboring nodes of a subgraph to a quantity of edges included in the subgraph is less than 0.0001. In some embodiments, the first condition can be that a quantity of edges in a subgraph is greater than a predetermined quantity value. In some embodiments, the first condition and/or the predetermined threshold quantity can be determined based on a subgraph division method. For example, if nodes with great relevance measure in a complete graph can be directly divided into a subgraph in a division method, the first condition or the predetermined threshold quantity does not need to be set.

Figure 4A:
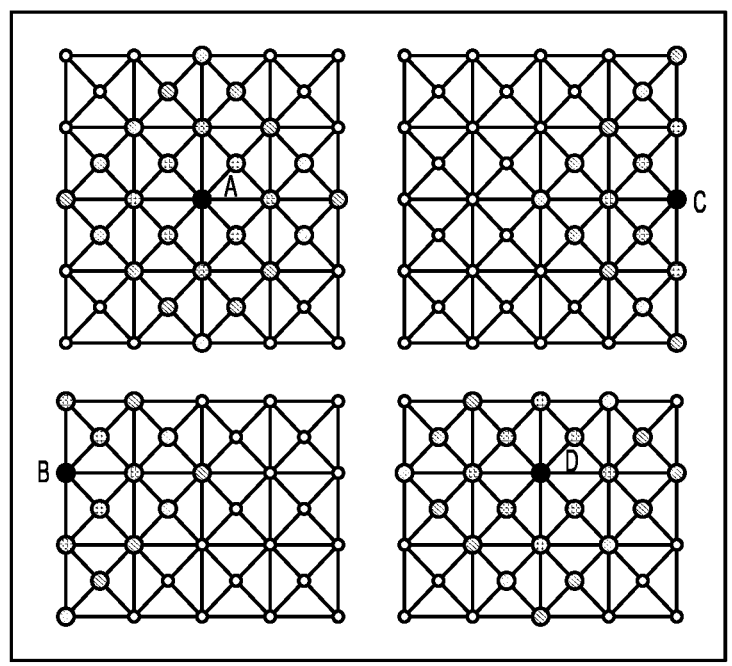
FIG. 4A and FIG. 4B are schematic diagrams illustrating a graph neural network training method, according to some embodiments of the present specification.
Figure 4B:
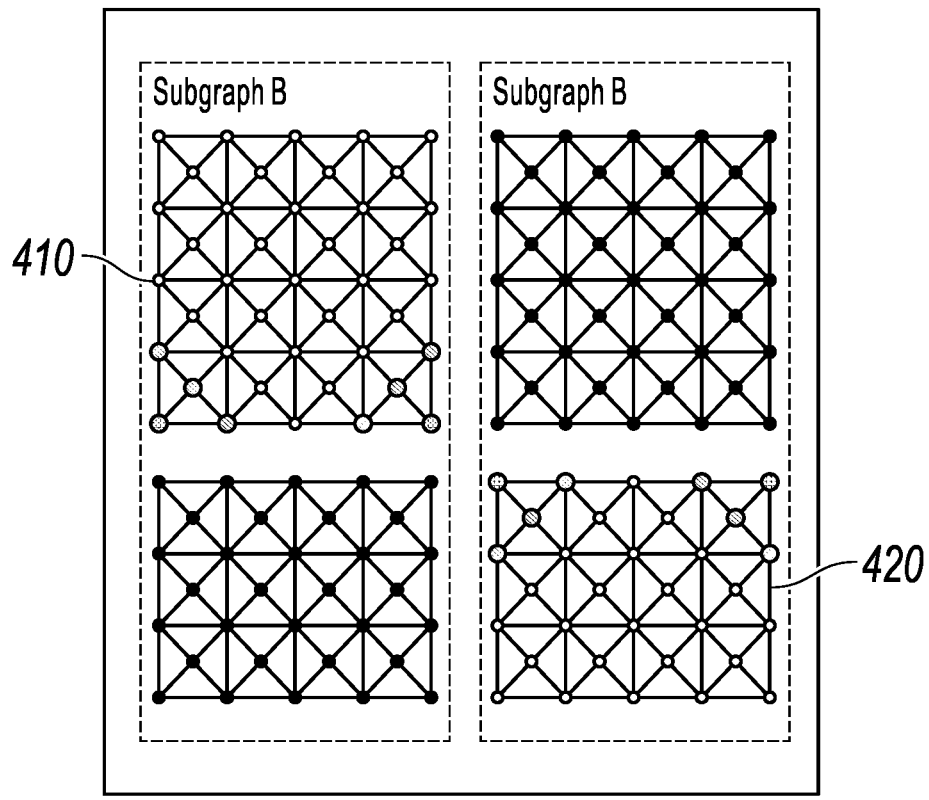

A neighboring node is a node connected to a certain node by one or more edges in a graph, that is, a node having an association with the node. If node $P_1$ in a graph can reach node $P_2$ through T (T≥1) edges, node $P_2$ is a T-th-degree neighbor of node $P_1$. A smaller value of T indicates greater relevance measure between a node and a T-th-degree neighbor. A neighboring node of a subgraph is a node that is adjacent to a node in the subgraph and that is not included in the subgraph. For example, as shown in FIG. 4A and FIG. 4B, each circle (including a solid circle, a mesh circle, a line circle, and a hollow circle) represents a node, and nodes are connected by edges. In FIG. 4A, a node represented by a mesh circle is a first-degree neighbor of node A represented by a solid circle, and a node represented by a line circle is a second-degree neighbor of node A. In subgraph B in FIG. 4B, a node represented by a mesh circle is a first-degree neighbor of subgraph A, and a node represented by a line circle is a second-degree neighbor of subgraph A.

In some embodiments, the processor can divide the complete graph into the plurality of subgraphs by using a community discovery algorithm. Nodes with dense edges in the complete graph can be divided into the same subgraph by using the community discovery algorithm. For example, a complete graph including ALIPAY user transfer relationships can be divided into a plurality of subgraphs by using the community discovery algorithm. Frequency of transfer between users within a subgraph is high, and frequency of transfer between a user within a subgraph and a user outside the subgraph is low or there is no transfer relationship. In some embodiments, community discovery algorithms can include but are not limited to a label propagation algorithm (LPA), a Girvan-Newman algorithm, a hop attention & node preference (HANP) algorithm, etc.

By dividing a complete graph into a plurality of subgraphs, nodes with great relevance measure in the complete graph can be divided into one subgraph, and nodes with small or no relevance measure can be divided into different subgraphs. For example, if nodes of a complete graph correspond to students in a school, and edges of the complete graph correspond to friend relationships among the students, nodes of a subgraph can correspond to a class in the school, and edges of the subgraph can correspond to friend relationships among students in the class.

Step 320: Select at least one subgraph that is to participate in graph neural network training from the plurality of subgraphs, obtain a training graph based on the selected at least one subgraph that is to participate in graph neural network training, and obtain, based on the training graph, a node feature vector of each node in the training graph. In some embodiments, step 320 can be performed by the second determining module 220.

In some embodiments, the processor can randomly select M subgraphs that are to participate in graph neural network training from the plurality of subgraphs obtained in step 310, and obtain a training graph based on the M subgraphs. In some embodiments, M can be any positive integer. For example, one subgraph can be selected as a training graph. For another example, 5, 10, or 50 subgraphs can be selected to obtain a training graph. In some embodiments, when a plurality of subgraphs are selected to participate in graph neural network training, a training graph can be obtained based on a union set of the selected M subgraphs.

In some embodiments, the processor can obtain a T-th-degree neighbor of each subgraph, and use the T-th-degree neighbor of each subgraph to update the subgraph, to obtain a plurality of updated subgraphs. Merely as an example, the processor can use a union set of a T-th-degree neighbor of a subgraph and the subgraph as an updated subgraph. In some embodiments, T can be any positive integer. Preferably, a value of T can be in a range of 1 to 3. For example, as shown in FIG. 4B, if T=2, updated subgraph A can include subgraph A, nodes represented by two mesh circles, nodes represented by six line circles, and edges between them in an area 410. In some embodiments, the processor can randomly select M subgraphs that are to participate in graph neural network training from a plurality of updated subgraphs.

In some embodiments, the processor can obtain, based on the training graph, a node feature vector of each node in the training graph. The node feature vector can reflect an attribute of the node. For example, if a node is a user, a node feature vector of the node can be a vector including feature information such as ALIPAY assets, account age, and monthly consumption of the user. In some embodiments, the processor can preprocess attributes of the node to reduce dimensions of the node feature vector. For example, n-dimensional attributes (that is, n features) of a node can be processed into a do-dimensional vector by using a node feature preprocessing function, a rectified linear unit function, or another related function.

Step 330: Perform propagation and aggregation based on the node feature vector of each node in the training graph and edges between nodes, to obtain a node fusion vector that is of each current node in the training graph and that includes neighboring node features and edge features. In some embodiments, step 330 can be performed by the fusion module 230.

When a graph neural network is trained, based on a quantity R of layers of the graph neural network, R-round propagation operations need to be performed on edges in a training graph, and R-round aggregation operations need to be performed on nodes in the training graph. R-round propagation and aggregation operations are performed on each node and each edge so that a node fusion vector that is of each node in the training graph and that includes neighboring node features and edge features can be obtained. For understanding of the solution, a feature vector of an initial point before an aggregation operation is performed on a node for the first time is denoted as a zeroth-order node vector of the initial point, a feature vector of the node after the r-th round aggregation operation on the r-th layer of the graph neural network is performed is denoted as an r-th order node vector, and a feature vector of an edge after the r-th round propagation operation on the r-th layer of the graph neural network is performed is denoted as an r-th order edge vector, where 0≤r≤R. Specifically, for each edge in the training graph, attributes of the edge, and an r−1-th order node vector of an initial point and an r−1-th order node vector of an arrival point that are obtained after the last round of propagation and aggregation operations are used as input to obtain an r-th order propagation vector of the edge by using the r-th propagation function. For each node, an r−1-th order node vector of the node and all r-th order propagation vectors of all edges whose starting points are the node are used as input to obtain an r-th order node vector of the node by using the r-th aggregation function. The previous propagation and aggregation operations are repeated for R rounds to obtain an R-th order node vector of each node in the training graph, that is, a node fusion vector obtained by fusing node features and edge features of all T-th-degree neighbors of the node.

In some embodiments, the quantity R of layers of the graph neural network can be the same as a quantity T of degrees of the T-th-degree neighbor of the node, for example, R=T=2. In some embodiments, the quantity R of layers of the graph neural network can be different from the quantity T of degrees of the T-th-degree neighbor of the node, for example, R=2, and T=0. In particular, when T=0, T-th-degree neighbors of each subgraph are not obtained. That is, at least one subgraph that is to participate in graph neural network training is directly selected from the plurality of subgraphs obtained in step 310.

Step 340: Obtain a loss function based on a node label and the node fusion vector in the training graph, and iteratively train an initial graph neural network based on the loss function to obtain the graph neural network. In some embodiments, step 340 can be performed by the training module 240.

The node label is a real label of sample data corresponding to the node. For example, in a graph neural network for prediction and classification, a node label can be a real category that corresponding sample data belongs to.

In some embodiments, a predicted value of the node can be obtained based on the node fusion vector of each node in the training graph, and the loss function can be obtained based on the predicted value and the node label. For example, the node fusion vector of each node in the training graph can be used as input to obtain the predicted value of each node based on a predictor function, and the loss function can be obtained based on the predicted value and the node label. In some embodiments, initial parameters of the initial graph neural network can be updated based on the loss function. The initial parameters are parameters corresponding to each function of the initial graph neural network before training. For example, the initial parameters can include but are not limited to initial parameters of the predictor function, initial parameters of the node feature preprocessing function, initial parameters of R propagation functions, and initial parameters of R aggregation functions. In some embodiments, the initial parameters can be obtained by using an initialization method. For example, the initialization method can be assigning parameters in matrices corresponding to the predictor function, the node feature preprocessing function, the R propagation functions, and the R aggregation functions to random real numbers not exceeding 100.

Iterative training is repeatedly performing the same operation for many times, for example, repeatedly performing step 320, step 330, and step 340 to update the parameters of the initial graph neural network based on the loss function. That is, at least one subgraph that is to participate in graph neural network training is selected in each round of training. In some embodiments, a quantity of iterations can be determined based on the loss function. For example, the quantity of iterations can be a quantity of iterations when a value of the loss function is less than a predetermined threshold quantity or when a model converges.

Parameters obtained after Ep times of iterative training are used as a training result, and a graph neural network formed by the predictor function, the node feature preprocessing function, the R propagation functions, and the R aggregation functions is obtained. That is, a trained graph neural network is obtained.

In some embodiments, in an iterative training process of the graph neural network, training graphs used in all rounds of training can share graph neural network parameters.

In a specific embodiment, assuming that the quantity of layers of the graph neural network and the quantity of degrees of the neighboring node of the node are both T, the processor can divide a complete graph G into P subgraphs $[g_1, g_2, \ldots g_p]$ by using the community discovery algorithm in step 310. Optionally, the processor can obtain a T-th-degree neighbor of each subgraph $g_p$, and merge the T-th-degree neighbor of each subgraph into the subgraph to obtain an updated subgraph $g_p = N_T$, where any p satisfies $1 \leq p \leq P$. In step 320, the processor can use the initialization method to initialize a parameter θ of a predictor function Dec, a parameter μ of node feature preprocessing Trans, T parameters $[\omega_0, \omega_1, \ldots, \omega_{T-1}]$ of T propagation functions $M_t$, and T parameters $[W_0, W_1, \ldots W_{T-1}]$ of T aggregation functions $Agg_t$ that constitute the initial graph neural network system. For example, the parameters can be initialized to a random natural number 3. Each function corresponds to a neural network, and parameters corresponding to each function represent a learnable two-dimensional matrix of a corresponding neural network. The graph neural network system is formed by neural network structures corresponding to the previous 2T+2 functions.

Assuming that the quantity of iterative training times is Ep, in each round of training, the processor can randomly select i subgraphs from the obtained P subgraphs, and participate in graph neural network training based on the i subgraphs, all edges and nodes in each subgraph of the i subgraphs, and attributes of the edges and nodes. The processor can obtain a training graph $B_k$ based on a union set $\cup \{g_i\}$ of the i subgraphs, where k represents a quantity of rounds of iterative training, and $1 \leq k \leq Ep$. Further, the processor can process n-dimensional attributes (which can be expressed as a n-dimensional vector, and each element in the vector is a natural number) of each node of the training graph $B_k$ into a $d_0$-dimensional vector by using the node feature preprocessing function Trans, to obtain a node feature vector $h_i^0 \leftarrow Trans((n_i | \mu))$ of each node. A superscript 0 in $h_i^0$ represents an initial, zeroth-order node vector before T rounds of calculation, and a subscript i represents a corresponding node.

In step 330, the initial, zeroth-order node vector $h_i^0$ of each node i in the training graph can be used as input to obtain, through calculation of T propagation functions and aggregation functions, a node fusion vector $h_i^T$ that is of each node i and that includes neighboring node features and edge features. Specifically, in the t-th ($1 \leq t \leq T$) propagation and aggregation calculation, for each edge in the training graph $B_k$, attributes $e_{i,j}^{t-1}$ (i and j respectively represent a starting point and an arrival point of the edge) of the edge, and a t−1-th order node vector $h_i^{t-1}$ of an initial point and a t−1-th order vector $h_j^{t-1}$ of an arrival point that are obtained in the last round are used as input to obtain a t-th order propagation vector $m_{i,j}^t \leftarrow M_t(h_i^{t-1}, h_j^{t-1}, e_{i,j}^{t-1} | W_{t-1})$ of the edge by using the t-th propagation function $M_t$. Further, for each node i in the training graph $B_k$, a t−1-th order node vector $h_i^{t-1}$ of the node i and all t-th order propagation vectors $m_{i,j}^t$ of all edges whose starting points are the node i are used as input to obtain a t-th order node vector $h_i^t \leftarrow Agg_t(h_i^t, \{m_{i,j}^t\} | \omega_{t-1})$ of the node i by using the t-th aggregation function $Agg_t$, where a node j is a neighboring node of the node i.

After calculation is performed on each edge and each node in the training graph by using T propagation functions $M_t$ and T aggregation functions $Agg_t$, a T-th order node vector $h_i^T$ of each node i in the training graph $B_k$ can be obtained, that is, a node fusion vector can be obtained. t represents a vector obtained by each calculation in T times of calculation, and T represents a vector obtained after all T times of calculation.

In step 340, the processor can use the node fusion vector $h_i^T$ of each node in the training graph as input to obtain a predicted value $\hat{y}_i \leftarrow \text{Dec}(h_i^T | \theta_{Dec})$ of each node by using a predictor function Dec. Optionally, the predicted value and a real label $y_i$ of each node i can be used as input to calculate a loss in this round of calculation by using the loss function, and the parameters can be updated by using the loss. For example, a loss obtained in each round of training can be used to obtain a derivative of each parameter in the parameter θ of the predictor function Dec, the parameter μ of node feature preprocessing Trans, the T parameters $[\omega_0, \omega_1, \ldots, \omega_{T-1}]$ of the T propagation functions $M_t$, and the T parameters $[W_0, W_1, \ldots, W_{T-1}]$ of the T aggregation functions $\text{Agg}_t$, and the parameter can be updated by using the derivative. In the k-th training of iterative training, parameters updated after the (k−1)-th training can be used for training. The previous steps are repeated, parameters updated for Ep times are used as a training result, and a trained graph neural network formed by the predictor function, the node feature preprocessing function, the T propagation functions, and the T aggregation functions can be obtained.

It should be understood by a person skilled in the art that the previously described graph neural network training method is merely an example and is not a limitation on the present specification. In some alternative embodiments, the functions constituting the graph neural network can be any feasible functions, and the parameters corresponding to the functions can be any reasonable values.

It is worthwhile to note that the previous description of the procedure 300 is merely an example for illustration, and does not limit the application scope of the present specification. A person skilled in the art can make various modifications and changes to the procedure 300 under the guidance of the present specification. However, these modifications and changes still fall within the scope of the present specification.

FIG. 4A and FIG. 4B are schematic diagrams illustrating a graph neural network training method, according to some embodiments of the present specification.

In a specific embodiment, as shown in FIG. 4B, if T=2, a complete graph is divided into subgraph A and subgraph B. All first-degree neighbors of subgraph A are nodes represented by two mesh circles in an area 410, and all second-degree neighbors of subgraph A are nodes represented by six line circles in the area 410. The first-degree neighbors and the second-degree neighbors of subgraph A and nodes represented by solid circles in subgraph A constitute updated subgraph A. All first-degree neighbors of subgraph B are nodes represented by two mesh circles in an area 420 (in the lower right), and all second-degree neighbors of subgraph B are nodes represented by six line circles in the area 420. The first-degree neighbors and the second-degree neighbors of subgraph B and nodes represented by solid circles in subgraph B constitute updated subgraph B.

In the first round of iterative training, updated subgraph A can be used as a training graph, and calculation can be performed on each node in the training graph by using a node feature preprocessing function, a propagation function, an aggregation function, and a predictor function in an initial graph neural network, to obtain a loss function. Initial parameters of the initial graph neural network can be updated based on the loss function. In the second round of iterative training, updated subgraph B can be used as a training graph, and calculation can be performed on each node in the training graph by using a node feature preprocessing function, a propagation function, an aggregation function, and a predictor function in the initial graph neural network, to obtain a loss function. Parameters of the initial graph neural network can be updated based on the loss function.

In the first round of training, predicted values and loss functions of nodes represented by 32 solid circles of subgraph A can be obtained, and a total of 40 nodes (the nodes represented by 32 solid circles, nodes represented by two mesh circles, and nodes represented by six line circles) participate in calculation. In the second round of training, predicted values and loss functions of nodes represented by 41 solid circles of subgraph B can be obtained, and a total of 49 nodes (the nodes represented by 41 solid circles, nodes represented by two mesh circles, and nodes represented by six line circles) participate in calculation.

In the previous training process, to calculate a predicted value of one node represented by a solid circle, calculation needs to be performed on (40+49)/(32+41)=1.22 nodes on average.

As shown in FIG. 4A, if some nodes in the complete graph are selected to participate in graph neural network training, for example, in the first round of training, if node A and node B represented by solid circles and first-degree neighbors (nodes represented by mesh circles) and second-degree neighbors (nodes represented by line circles) of node A and node B are selected for training, predicted values and loss functions of node A and node B can be obtained. Node A has eight first-degree neighbors and sixteen second-degree neighbors, and node B has five first-degree neighbors and seven second-degree neighbors. A total of 36 neighboring nodes participate in calculation. In the second round of training, node C and node D represented by solid circles and first-degree neighbors and second-degree neighbors of node C and node D are selected for training, and predicted values and loss functions of node C and node D can be obtained. Node C has five first-degree neighbors and nine second-degree neighbors, and node D has eight first-degree neighbors and thirteen second-degree neighbors. A total of 35 neighboring nodes participate in calculation. In this method, to calculate a predicted value of one node, calculation needs to be performed on (36+35+4)/4=18.75 nodes on average.

Possible beneficial effects of the embodiments of the present specification include but are not limited to the following: A complete graph is divided into a plurality of subgraphs with great internal node relevance measure, and a graph neural network is iteratively trained based on a subgraph. As such, the amount of data calculation of a graph neural network system and calculation redundancy in training can be reduced.

It is worthwhile to note that different embodiments may produce different beneficial effects. In different embodiments, possible beneficial effects can be any one or any combination of the previously described beneficial effects, or any other beneficial effects that may be obtained.

The basic concepts have been described above. Obviously, for a person skilled in the art, the previous detailed disclosure is merely an example and does not constitute a limitation on the present specification. Although it is not clearly stated here, a person skilled in the art may make various modifications, improvements, and amendments to the present specification. Such modifications, improvements, and amendments are proposed in the present specification. Therefore, such modifications, improvements, and amendments still fall within the spirit and scope of the example embodiments of the present specification.

In addition, specific words are used in the present specification to describe the embodiments of the present specification. For example, "an embodiment" and/or "some embodiments" refer to a certain feature, structure, or characteristic related to at least one embodiment of the present specification. Therefore, it is worthwhile to emphasize and note that "an embodiment" or "an alternative embodiment" mentioned twice or more in different positions in the present specification does not necessarily refer to the same embodiment. In addition, some features, structures, or characteristics in one or more embodiments of the present specification can be appropriately combined.

In addition, unless clearly stated in the claims, the order of processing elements and sequences, the use of numbers and letters, or the use of other names in the present specification is not intended to limit the order of the procedures and methods in the present specification. Although some inventive embodiments that are currently considered useful are discussed through various examples in the previous disclosure, it should be understood that such details are merely for the purpose of illustration, and the appended claims are not limited to the disclosed embodiments. On the contrary, the claims are intended to cover all amendments and equivalent combinations that conform to the essence and scope of the embodiments of the present specification. For example, although the system components described above can be implemented by hardware devices, the system components can also be implemented only by using software solutions, such as installing the described systems on existing servers or mobile devices.

Similarly, it is worthwhile to note that to simplify the description of the disclosure in the present specification to help understand one or more inventive embodiments, in the previous description of the embodiments of the present specification, a plurality of features are sometimes incorporated into one embodiment, one accompanying drawing, or the description thereof. However, this disclosure method does not mean that the object in the present specification needs more features than those mentioned in the claims. Actually, features of an embodiment are less than all the features of the single embodiment disclosed above.

In some embodiments, numbers describing quantities of components and attributes are used. It should be understood that such numbers used for the description of the embodiments are modified by the modifier "approximately" or "about" in some examples. Unless otherwise stated, "approximately" or "about" indicates that ±20% variations of the numbers are allowed. Correspondingly, in some embodiments, the numerical parameters used in the present specification and the claims are approximate values, which can be changed based on the characteristics needed by individual embodiments. In some embodiments, the specified significant digits of the numerical parameters should be considered, and a general digit retention method should be used. Although the numerical fields and parameters used to determine the range in some embodiments of the present specification are approximate values, in specific embodiments, the setting of such values should be as accurate as possible within the feasible range.

For each patent, patent application, patent application publication, and other materials such as articles, books, specifications, publications, and documents cited in the present specification, all content of them are hereby incorporated into the present specification for reference. The application history documents that are inconsistent with or conflict with the content of the present specification, and the documents (currently or later appended to the present specification) that limit the widest scope of the claims of the present specification are excluded. It is worthwhile to note that in case of any inconsistency or conflict between the description, definition, and/or use of terms in the supplementary materials of the present specification and the content described in the present specification, the description, definition, and/or use of terms in the present specification shall prevail.

Finally, it should be understood that the embodiments described in the present specification are merely used to illustrate the principles of the embodiments of the present specification. Other variants may also fall within the scope of the present specification. Therefore, as an example but not a limitation, the alternative configurations of the embodiments of the present specification can be considered to be consistent with the teaching of the present specification. Accordingly, the embodiments of the present specification are not limited to the embodiments clearly described in the present specification.

What is claimed is:

1. A computer-implemented method for training a graph neural network, wherein the method comprises:
    obtaining a complete graph that comprise a plurality of nodes that correspond to respective samples and edges between the plurality of nodes that correspond to relationships between the respective samples;
    dividing the complete graph into a plurality of subgraphs according to a predetermined condition;
    obtaining a training graph to participate in graph neural network training based on selecting at least one subgraph from the plurality of subgraphs;
    obtaining, based on the training graph, a node feature vector of each node in the training graph;
    obtaining a node fusion vector of each current node in the training graph based on performing propagation and aggregation based on the node feature vector of each node in the training graph and edges connected to the node, wherein the node fusion vector of each current node comprises node features of neighboring nodes of the current node and edge features of neighboring edges of the current node;
    determining a loss function based on node labels and the node fusion vectors in the training graph, wherein the node labels each specify a real label of a sample corresponding to a current node in the training graph; and
    iteratively training the graph neural network to update parameter values of the graph neural network based on optimizing the loss function.

2. The computer-implemented method according to claim 1, wherein the dividing the complete graph into the plurality of subgraphs according to a predetermined condition comprises:
    dividing the complete graph into the plurality of subgraphs according to the predetermined condition by using a community discovery algorithm.

3. The computer-implemented method according to claim 1, wherein the predetermined condition comprises:
    a ratio between a quantity of neighboring nodes of each node in a subgraph and a quantity of edges included in the subgraph satisfy a first condition, and a quantity of nodes included in the subgraph is less than or equal to a predetermined threshold quantity.

4. The computer-implemented method according to claim 3, further comprising adaptively setting the predetermined threshold quantity based on available computing power of a training system used to train the graph neural network.

5. The computer-implemented method according to claim 1, wherein selecting the at least one subgraph from the plurality of subgraphs comprises:
  obtaining an updated subgraph for each of the plurality of subgraphs based on the subgraph and T-th-degree neighbors of the subgraph; and
  selecting the at least one subgraph from the updated subgraphs.

6. The computer-implemented method according to claim 5, wherein T equals one, two, or three.

7. The computer-implemented method according to claim 1, wherein obtaining the training to participate in the graph neural network training comprises:
  generating the training graph based on a union set of the at least one subgraph that is selected from the plurality of subgraphs.

8. The computer-implemented method according to claim 1, wherein the relationships represented by the edges between the plurality of nodes in the complete graph comprise relevance measures between the plurality of nodes.

9. A non-transitory, computer-readable medium storing one or more instructions executable by a computer system to perform operations for training a graph neural network, wherein the operations comprise:
  obtaining a complete graph that comprise a plurality of nodes that correspond to respective samples and edges between the plurality of nodes that correspond to relationships between the respective samples;
  dividing the complete graph into a plurality of subgraphs according to a predetermined condition;
  obtaining a training graph to participate in graph neural network training based on selecting at least one subgraph from the plurality of subgraphs;
  obtaining, based on the training graph, a node feature vector of each node in the training graph;
  obtaining a node fusion vector of each current node in the training graph based on performing propagation and aggregation based on the node feature vector of each node in the training graph and edges connected to the node, wherein the node fusion vector of each current node comprises node features of neighboring nodes of the current node and edge features of neighboring edges of the current node;
  determining a loss function based on node labels and the node fusion vectors in the training graph, wherein the node labels each specify a real label of a sample corresponding to a current node in the training graph; and
  iteratively training the graph neural network to update parameter values of the graph neural network based on optimizing the loss function.

10. The non-transitory, computer-readable medium according to claim 9, wherein dividing the complete graph into the plurality of subgraphs according to a predetermined condition comprises:
  dividing the complete graph into the plurality of subgraphs according to the predetermined condition by using a community discovery algorithm.

11. The non-transitory, computer-readable medium according to claim 10, wherein the predetermined condition comprises:
  a ratio between a quantity of neighboring nodes of each node in a subgraph and a quantity of edges included in the subgraph satisfy a first condition, and a quantity of nodes included in the subgraph is less than or equal to a predetermined threshold quantity.

12. The non-transitory, computer-readable medium according to claim 11, further comprising adaptively setting the predetermined threshold quantity based on available computing power of a training system used to train the graph neural network.

13. The non-transitory, computer-readable medium according to claim 10, wherein selecting the at least one subgraph from the plurality of subgraphs comprises:
  obtaining an updated subgraph for each of the plurality of subgraphs based on the subgraph and T-th-degree neighbors of the subgraph; and
  selecting the at least one subgraph from the updated subgraphs.

14. The non-transitory, computer-readable medium according to claim 13, wherein T equals one, two, or three.

15. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations for training a graph neural network, wherein the operations comprise:
  obtaining a complete graph that comprise a plurality of nodes that correspond to respective samples and edges between the plurality of nodes that correspond to relationships between the respective samples;
  dividing the complete graph into a plurality of subgraphs according to a predetermined condition;
  obtaining a training graph to participate in graph neural network training based on selecting at least one subgraph from the plurality of subgraphs;
  obtaining, based on the training graph, a node feature vector of each node in the training graph;
  obtaining a node fusion vector of each current node in the training graph based on performing propagation and aggregation based on the node feature vector of each node in the training graph and edges connected to the node, wherein the node fusion vector of each current node comprises node features of neighboring nodes of the current node and edge features of neighboring edges of the current node;
  determining a loss function based on node labels and the node fusion vectors in the training graph, wherein the node labels each specify a real label of a sample corresponding to a current node in the training graph; and
  iteratively training the graph neural network to update parameter values of the graph neural network based on optimizing the loss function.

16. The computer-implemented system according to claim 15, wherein the dividing the complete graph into the plurality of subgraphs according to a predetermined condition comprises:
  dividing the complete graph into the plurality of subgraphs according to the predetermined condition by using a community discovery algorithm.

17. The computer-implemented system according to claim 15, wherein the predetermined condition comprises:
  a ratio between a quantity of neighboring nodes of each node in a subgraph and a quantity of edges included in the subgraph satisfy a first condition, and a quantity of nodes included in the subgraph is less than or equal to a predetermined threshold quantity.

18. The computer-implemented system according to claim 17, further comprising adaptively setting the predetermined threshold quantity based on available computing power of a training system used to train the graph neural network.

19. The computer-implemented system according to claim 15, wherein selecting the at least one subgraph from the plurality of subgraphs comprises:
   obtaining an updated subgraph for each of the plurality of subgraphs based on the subgraph and T-th-degree neighbors of the subgraph; and
   selecting the at least one subgraph from the updated subgraphs.

20. The computer-implemented system according to claim 19, wherein T equals one, two, or three.

* * * * *

UNITED STATES PATENT AND TRADEMARK OFFICE
CERTIFICATE OF CORRECTION

PATENT NO. : 11,227,190 B1
APPLICATION NO. : 17/362963
DATED : January 18, 2022
INVENTOR(S) : Li et al.

Page 1 of 1

It is certified that error appears in the above-identified patent and that said Letters Patent is hereby corrected as shown below:

On the Title Page

Below "Filed: Jun. 29, 2021" insert -- (30) Foreign Application Priority Data Aug. 25, 2020 (CN) ..................... 202010864281.0 --, as a new field entry Signed and Sealed this
Thirty-first Day of May, 2022

Katherine Kelly Vidal
*Director of the United States Patent and Trademark Office*